US010920651B2

(12) United States Patent
Amann

(10) Patent No.: US 10,920,651 B2
(45) Date of Patent: Feb. 16, 2021

(54) INTERNAL COMBUSTION ENGINE COMPRISING A TURBOCHARGER

(71) Applicant: Liebherr-Components Colmar SAS, Colmar (FR)

(72) Inventor: Martin Amann, Fegersheim (FR)

(73) Assignee: Liebherr-Components Colmar SAS, Colmar (FR)

( * ) Notice: Subject to any disclaimer, the term of this patent is extended or adjusted under 35 U.S.C. 154(b) by 0 days.

(21) Appl. No.: 16/260,853

(22) Filed: Jan. 29, 2019

(65) Prior Publication Data

US 2019/0234287 A1    Aug. 1, 2019

(30) Foreign Application Priority Data

Jan. 29, 2018    (DE) .................. 10 2018 101 948

(51) Int. Cl.
*F01P 3/20*    (2006.01)
*F01P 3/12*    (2006.01)
*F02B 29/04*   (2006.01)
*F01P 7/16*    (2006.01)
*F01P 7/14*    (2006.01)

(52) U.S. Cl.
CPC ........ *F01P 3/20* (2013.01); *F01P 3/12* (2013.01); *F01P 7/16* (2013.01); *F02B 29/04* (2013.01); *F02B 29/0443* (2013.01); *F01P 2007/146* (2013.01); *F01P 2025/30* (2013.01); *F01P 2060/02* (2013.01); *F01P 2060/04* (2013.01)

(58) Field of Classification Search
CPC  F01P 3/12; F01P 3/20; F01P 2007/146; F01P 2025/30; F01P 2060/02; F01P 2060/04; F02B 29/04; F02B 29/0443
See application file for complete search history.

(56) References Cited

U.S. PATENT DOCUMENTS 5,876,256 A * 3/1999 Takahashi ............... F01P 3/202
                                                              440/1
8,960,166 B2   2/2015 Styles et al.
(Continued)

FOREIGN PATENT DOCUMENTS

DE         3617350 C1    10/1987
DE    102006033314 A1     3/2007
(Continued)

OTHER PUBLICATIONS

European Patent Office, Extended European Search Report Issued in Application No. 19154124.2, dated May 15, 2019, Germany, 7 pages.

*Primary Examiner* — Brandon D Lee
(74) *Attorney, Agent, or Firm* — McCoy Russell LLP

(57) ABSTRACT

The present application refers to an internal combustion engine comprising a turbocharger, an intercooler and a cooling circuit for cooling of the intercooler, the cooling circuit comprising adjusting means for adjusting a temperature of a cooling liquid of the cooling circuit flowing through the intercooler, the internal combustion engine comprising a controller for controlling the adjusting means of the cooling circuit, the controller comprising a function for determining a dew point temperature of the charge air, characterized in that the controller is configured to control the temperature of the cooling liquid and/or of the intercooler relative to the dew point temperature.

18 Claims, 3 Drawing Sheets

(56) References Cited

U.S. PATENT DOCUMENTS

| | | | | |
|---|---|---|---|---|
| 9,739,194 | B2* | 8/2017 | Kuske | F02B 29/045 |
| 2008/0034752 | A1* | 2/2008 | Becker | F02B 37/001 |
| | | | | 60/599 |
| 2013/0147203 | A1* | 6/2013 | Gillett | F01P 7/16 |
| | | | | 290/1 A |
| 2014/0046511 | A1* | 2/2014 | Uzkan | F02M 35/1038 |
| | | | | 701/19 |
| 2014/0109846 | A1 | 4/2014 | Styles et al. | |
| 2015/0369179 | A1* | 12/2015 | Hotta | F02D 41/0065 |
| | | | | 123/568.12 |
| 2016/0014844 | A1* | 1/2016 | Schlipf | H01F 27/2823 |
| | | | | 219/544 |
| 2018/0100709 | A1* | 4/2018 | Gopal | F28D 20/028 |
| 2018/0334951 | A1* | 11/2018 | Uto | F02B 29/04 |

FOREIGN PATENT DOCUMENTS

| | | |
|---|---|---|
| DE | 102010034131 A1 | 2/2012 |
| DE | 102012204649 A1 | 9/2013 |
| DE | 102014209994 A1 | 12/2014 |
| DE | 102016209953 A1 | 12/2017 |
| WO | 2011073512 A1 | 6/2011 |

* cited by examiner

INTERNAL COMBUSTION ENGINE COMPRISING A TURBOCHARGER

CROSS REFERENCE TO RELATED APPLICATIONS

The present application claims priority to German Application No. 10 2018 101 948.3 entitled "AN INTERNAL COMBUSTION ENGINE COMPRISING A TURBO-CHARGER," filed Jan. 29, 2018. The entire contents of the above-listed application are hereby incorporated by reference in their entirety for all purposes.

TECHNICAL FIELD

The present application relates to an internal combustion engine comprising a turbocharger, an intercooler and a cooling circuit for the intercooler.

BACKGROUND AND SUMMARY

In order to reduce fuel consumption and/or emissions of an engine, it is beneficial to reduce the temperature of the charge air flowing to the inlet valves. For this purpose, the intercooler is provided to reduce the temperature of the charge air flowing from the compressor of the turbocharger to the inlet manifold of the engine. The intercooler is arranged in a cooling circuit, the cooling circuit being provided with a heat exchanger for in turn cooling the cooling liquid.

However, depending on ambient conditions such as humidity, temperature and pressure, and on charge air pressure, water vapor in the charge air may condense if the temperature of the charge air falls below its dew point temperature. This could lead to corrosion of the intake duct and inlet valves of the engine.

Therefore, it is known from WO 2011/073512 A1 to determine a dew point temperature of the charge air, and to adjust the temperature of the charge air leaving the intercooler to be higher than the dew point temperature by controlling the temperature of a low temperature cooling liquid by mixing it with high temperature cooling liquid. However, this method does not completely avoid corrosion of the engine dew to condensation.

The object of the present disclosure is therefore to provide an improved engine and an improved method.

This object is solved by the engine comprising a turbocharger, an intercooler and a cooling circuit for cooling of the intercooler, the cooling circuit comprising an adjusting device for adjusting a temperature of a cooling liquid of the cooling circuit flowing through the intercooler, the internal combustion engine comprising a controller for controlling the adjusting device of the cooling circuit, the controller comprising a function for determining a dew point temperature of the charge air, wherein the controller is configured to control the temperature of the cooling liquid and/or of the intercooler relative to the dew point temperature.

Embodiments of the present disclosure form the subject matter of the dependent claims.

The present disclosure comprises an internal combustion engine comprising a turbocharger, an intercooler and a cooling circuit for cooling of the intercooler, the cooling circuit comprising adjusting means for adjusting a temperature of the cooling liquid flowing through the intercooler. The internal combustion engine further comprises a controller for controlling the adjusting means of the cooling circuit, the controller comprising a function for determining a dew point temperature of the charge air. According to the present disclosure, the controller is configured to control the temperature of the cooling liquid and/or of the intercooler relative to the dew point temperature. The controller may be configured to control the temperature of the cooling liquid and/or of the intercooler to be at or above the dew point temperature.

Instead of controlling the temperature of the charge air to be above the dew point temperature, as in WO 2011/073512 A1, the present disclosure controls the temperature of the cooling liquid and/or of the intercooler relative to the dew point temperature and in particular controls the temperature of the cooling liquid and/or of the intercooler to be at or above the dew point temperature. This is based on the realization of the inventor of the present disclosure that by controlling the charge air temperature to be above the dew point temperature, as in WO 2011/073512 A1, the temperature of the intercooler might still be below the dew point temperature, leading to condensation on the internal walls of the intercooler and thereby to corrosion. In contrast, by controlling the temperature of the cooling liquid or the intercooler, condensation is completely avoided by the present disclosure.

In an embodiment, the engine of the present disclosure comprises a temperature sensor for sensing the temperature of the coolant and/or of the intercooler, and the controller comprises a feedback function for comparing the temperature sensed by the temperature sensor with a dew point temperature threshold, the controller being configured to control the adjusting device in dependence on the output of the feedback function.

In a first embodiment, the present disclosure controls the temperature of the cooling liquid relative to dew point temperature and in particular to be at or above the dew point temperature. This is particularly easy to implement. Further, by controlling the temperature of the cooling liquid in this way, it is guaranteed that the temperature of the intercooler will not fall below dew point temperature. Optionally, the temperature of the cooling liquid is controlled on the basis of a temperature sensor arranged in the cooling circuit, optionally at a position upstream of the intercooler.

In a second embodiment, the present disclosure controls the temperature of the intercooler relative to dew point temperature and in particular to be at or above the dew point temperature. Optionally, the temperature of the intercooler is controlled on the basis of a temperature sensor arranged at the intercooler.

In an embodiment of the present disclosure, the adjusting device comprises a control element for controlling a cooling liquid flow through a heat exchanger used for cooling the cooling liquid and/or through a by-pass of a heat exchanger used for cooling the cooling liquid. The control element may be located upstream or downstream of the heat exchanger in the cooling circuit.

In an embodiment, the control element is a passive temperature control element of a thermostat provided with a resistive heater for adjusting the control temperature of the passive temperature control element.

In an embodiment, the control element comprises a controlled valve, in particular a controlled flap. Optionally, the valve is electronically controlled.

In an embodiment, the engine further comprises an ambient air pressure sensor and/or an ambient air temperature and/or a humidity sensor, wherein the sensor values are used as input for the controller for determining the dew point temperature.

In an embodiment, the engine further comprises a charge air pressure sensor, wherein the sensor values are used as input for the controller for determining the dew point temperature.

In an embodiment, the controller has a function for determining charge air pressure in dependence on engine parameters, in particular depending on engine speed and injected fuel quantity, or a more advanced boost pressure model, wherein the determined charge air pressure is used as input for the controller for determining the dew point temperature.

In an embodiment, the coolant circuit is a low temperature cooling circuit, the engine further comprising a high temperature cooling circuit. The low temperature circuit and the high pressure circuit may be independent from each other. Further optionally, there is no mixing of the coolant of the low temperature and the high temperature circuit.

In an embodiment, the low temperature cooling circuit is used for cooling the intercooler and at least the turbocharger. In particular, the intercooler and the turbocharger can be arranged in parallel in the low temperature cooling circuit.

In an embodiment, the high temperature cooling circuit is used for cooling a cylinder head of the engine and/or a cylinder liner of the engine and/or engine oil.

The present disclosure further comprises a method for operating an internal combustion engine comprising a turbocharger, an intercooler and a cooling circuit for the intercooler, comprising the steps of:
  determining a dew point temperature of the charge air, and
  adjusting a temperature of a cooling liquid flowing through the intercooler.

According to the present disclosure, the temperature of the cooling liquid and/or of the intercooler is controlled relative to dew point temperature and in particular to be at or above the dew point temperature.

In particular, the method may comprise the step of measuring a temperature of the cooling liquid and/or of the intercooler and of adjusting the temperature of the cooling liquid such that the temperature of the cooling liquid and/or of the intercooler is at or above the dew point temperature.

In an embodiment, the method is for controlling an engine as described above, and/or is performed as described above with respect to the engine.

The present disclosure further comprises a machine comprising an engine as described above, the application preferably being a mobile application and/or comprising a generator driven by the engine.

In particular, the machine may be a mobile working machine, in particular an earth moving machine, in particular an excavator and/or a dumper truck.

BRIEF DESCRIPTION OF DRAWINGS

The present disclosure will now be described on the basis of an embodiment and drawings.

In the drawings.

DETAILED DESCRIPTION

Figure 1:
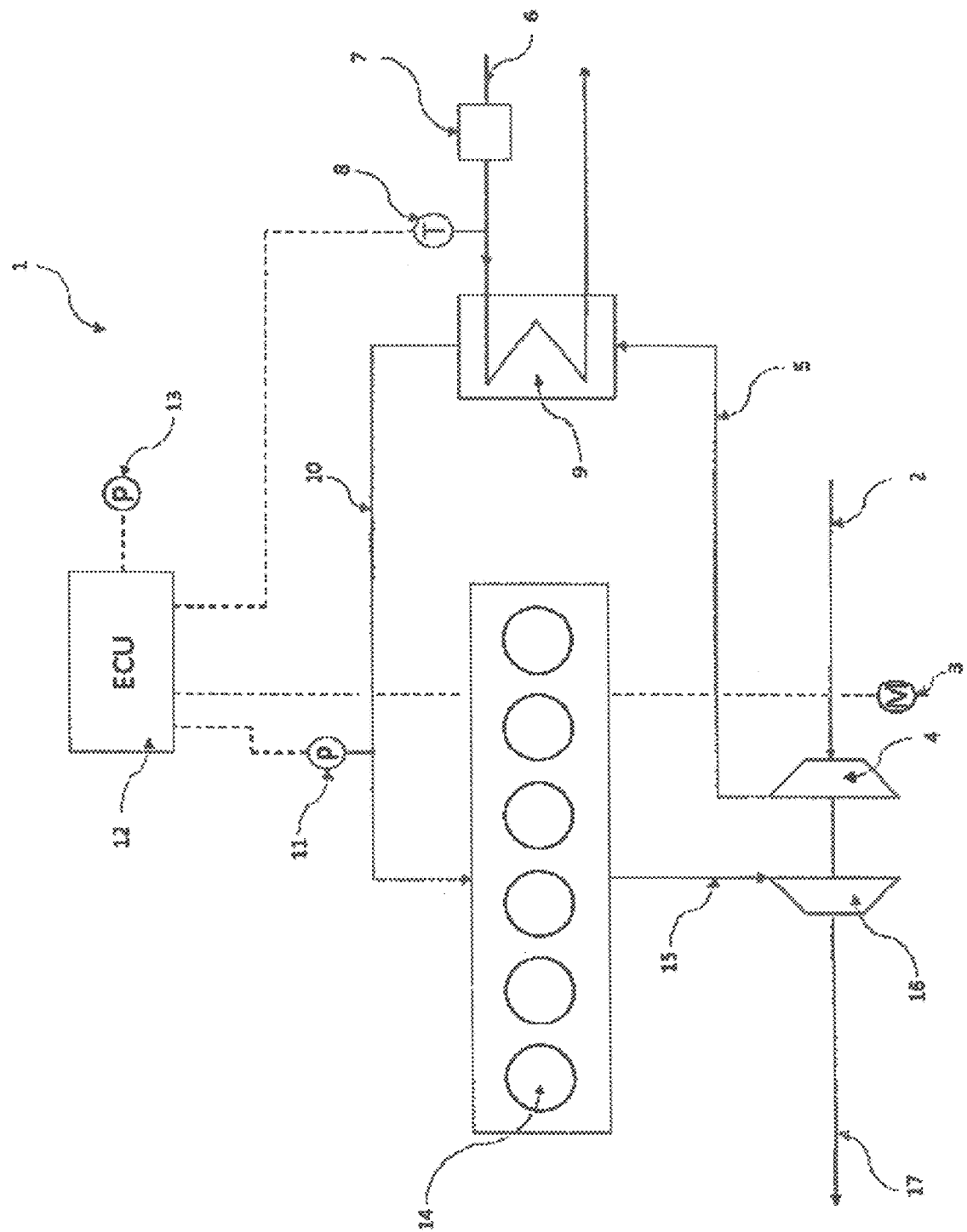
FIG. 1: shows an embodiment of the internal combustion engine of the present disclosure.

FIG. 1 shows an embodiment of a turbocharged internal combustion engine according to the present disclosure. In the embodiment shown, the engine is a single stage turbocharged engine. However, the present application can also be applied to engines having multiple stages of turbocharging.

The engine 1 contains a turbocharger comprising a compressor 4 and a turbine 16. Air enters the compressor 4 from an air inlet channel 2 and is compressed. The compressed air flows through charge air duct to the inlet manifold 10 of the engine, which feeds the cylinders 14 with pressurized air. From the cylinders 14, exhaust gases will flow through exhaust channel 15 to turbine 16 of the turbocharger. After expanding in the turbine 16, the exhaust gasses flow through an exhaust gas duct 17, for example to an exhausted gas after treatment system.

The turbine 16 of the turbocharger is mechanically connected to the compressor 4 of the turbocharger in order to drive the compressor. Thereby, the compressor 4 compresses the ambient air coming from the inlet channel 2. Due to the compression of the air, the air temperature increases.

Therefore, an intercooler 9 is arranged upstream of the compressor 4 between the compressor 4 and inlet manifold 10 of the engine 1 in the charge air duct 5.

In the embodiment, the intercooler has a first heat exchange duct arranged in the charge air duct 5, and a second heat exchange duct connected to a cooling circuit 6, such that cooling liquid of the cooling circuit will flow through the second heat exchange duct for cooling of air flowing through the first heat exchange duct. In the embodiment, the intercooler is an air/water intercooler, i.e. the cooling liquid is water. However, other cooling liquids could be used as well.

The cooling circuit 6 is further provided with adjusting device 7 for adjusting the temperature of the cooling liquid flowing through the cooling circuit 6 and the intercooler 9. The adjusting device is controlled by the engine control unit 12 (ECU). The engine control unit 12 is shown as a microprocessor with non-transitory memory storing instructions which controls the cooling circuit 6. The control unit 12 is shown receiving various signals from sensors coupled to the cooling circuit 6, and transmitting instructions to various actuators. The sensors may include temperature sensor 8, ambient air pressure sensor 13, humidity sensor 3, or boost pressure sensor 11, for example. (See FIGS. 2 and 3). The actuators may include the adjusting device 7, for example.

In an embodiment, the adjusting device 7 can be provided by using a map controlled thermostat or a flap. In particular, if a map controlled thermostat is used, the thermostat may be provided with a heating resistor located inside the map controlled thermostat. By heating the heating resistor, the controlled temperature of the map controlled thermostat can be electronically adjusted.

The engine control unit comprises a function of calculating dew point temperature on the basis of sensor signals. The function for determining dew point temperature of the engine control unit calculates dew point temperature of the charge air leaving the compressor 4 of the turbocharger on the basis of ambient air temperature, ambient air pressure, air humidity and the pressure of the charge air.

For this purpose, an ambient air pressure sensor 13 and a humidity sensor 3 for sensing humidity of ambient air are provided. The humidity sensor 3 may also comprise a temperature sensor. Further, a boost pressure sensor 11 is used for measuring the charge air pressure. However, in an alternative embodiment, the input values from the boost pressure sensor 11 could also be replaced by software calibration, in particular by providing a boost pressure calculating function calculating the boost pressure based on engine values, and in particular based on engine speed and injected fuel quantity, or a more advanced boost pressure model.

In the embodiment of the present disclosure, the controller is configured to control the temperature of the cooling liquid flowing in the cooling circuit 6 relative to the dew point temperature calculated by the engine control unit. In particular, the engine control unit comprises a control function for controlling the temperature of the cooling liquid in the cooling circuit 6 to be at or above the dew point temperature. Thereby, condensation on the walls of the intercooler 9 is securely avoided, because the temperature of the walls of the intercooler is always kept at or above dew point temperature.

For controlling the temperature of the cooling liquid, the engine is provided with a temperature sensor 8 for sensing the temperature of the cooling liquid flowing through the cooling circuit 6 at a position before it enters the intercooler 9. The control function of the engine control unit uses the sensor values from the temperature sensor 8 as an input, and compares the temperature with the dew point temperature. Based on this comparison, the controller is configured to control the adjusting device 7 such that the temperature of the cooling liquid is at or above dew point temperature.

In particular, the control function can be programmed such that cooling liquid 6 in the cooling circuit is cooled as long as its temperature is still above dew point temperature. Once the temperature of the cooling liquid 6 reaches the dew point temperature or falls below, cooling of the cooling liquid is deactivated or reduced.

Figure 2:
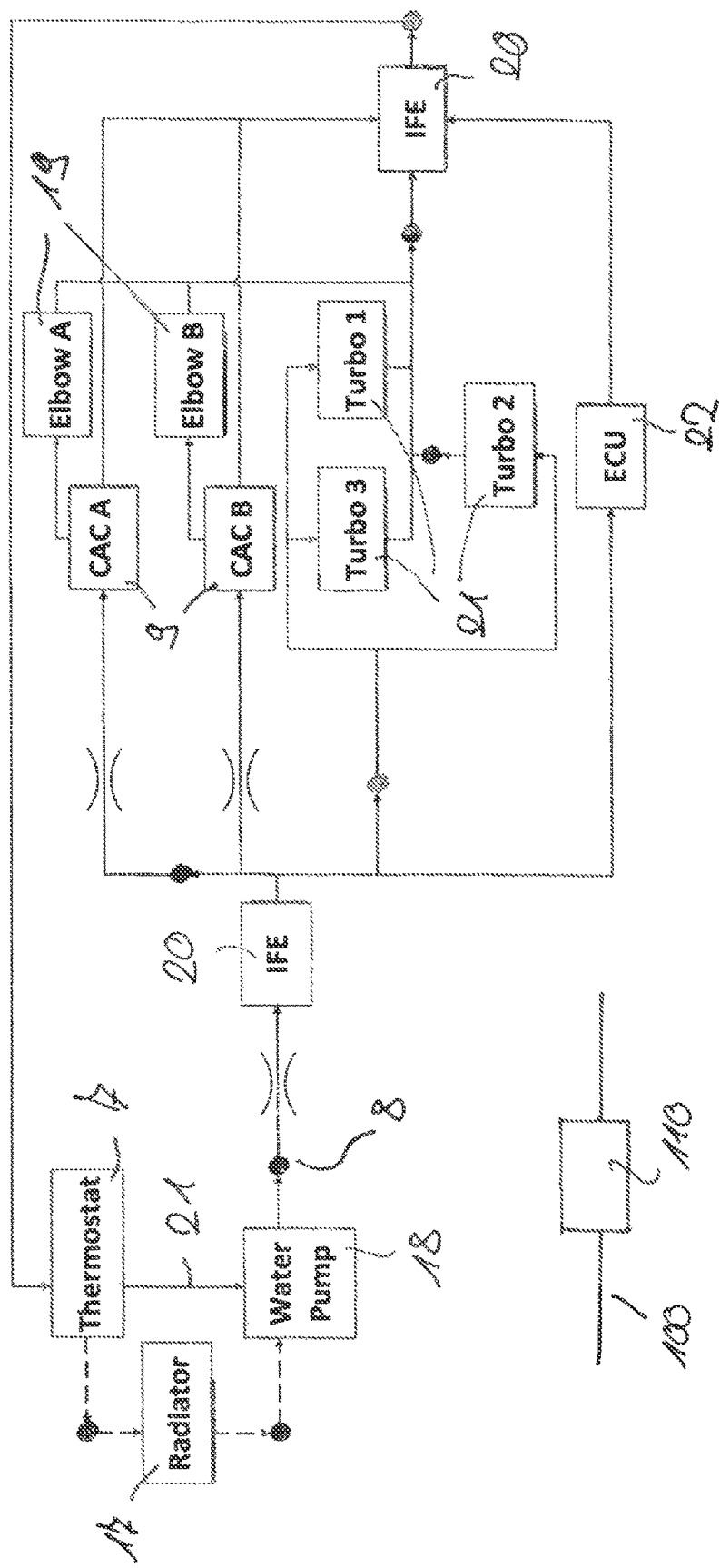
FIG. 2: shows an embodiment of a low temperature cooling circuit used for cooling of the intercooler

FIG. 2 shows an embodiment of a cooling circuit 6 used for cooling the cooling liquid flowing though the intercooler 9. In particular, the cooling circuit 6 is provided with a heat exchanger 17 for cooling the cooling liquid, in particular a radiator. The heat exchanger 17 may be cooled by ambient air. Further, the cooling circuit 6 is provided with a water pump 18 for pumping the cooling liquid through the cooling circuit 6.

The adjusting device 7 is provided in order to control the liquid flow through the heat exchanger 17 and a bypass 21 of the heat exchanger 17. By controlling the amount of liquid flowing through the heat exchanger 17 relative to the amount of cooling liquid flowing through the bypass 21, the temperature of the cooling liquid flowing through the cooling circuit can be controlled.

In the embodiment, the adjusting device 7 is arranged at a position downstream of the heat exchanger 17. In alternative embodiments, the adjusting means 7 could also be arranged upstream of the heat exchanger 17.

In the embodiment, the adjusting device is provided by a map controlled thermostat. Such a map controlled thermostat comprises a passive temperature control element, which expands or contracts because of temperature changes and thereby controls fluid flow in dependence on cooling liquid temperature. By arranging a heater on the map controlled thermostat, the temperature behavior of this passive element can be changed.

Thereby, in the embodiment, if the heater on the map controlled thermostat is activated, the control temperature of the thermostat will be lowered, such that more cooling liquid will flow through the heat exchanger 17, thereby decreasing the temperature of the cooling liquid flowing though the intercooler 9. If the heater is switched off, the control temperature of the thermostat will be increased, such that less cooling liquid will flow through the heat exchanger 17.

Other adjusting devices or control elements, and other control methods, could be used for the inventive control. For example, a flap or valve could be used for controlling the liquid flow through the heat exchanger 17, and through bypass 21.

For controlling the temperature of the coolant flowing through the intercooler, a temperature sensor 8 is provided downstream of the intercooler 9.

In the embodiment, the cooling circuit 6 is not only used for cooling of the intercooler 9, but also for the cooling of the turbocharger 21 and the engine controller 22. The engine controller 22 may be shown as previously described with respect to the engine control unit 12 of FIG. 1.

The heat exchange duct of the intercooler 9, as well as the heat exchange duct of the turbocharger 21 and of the engine electronics 22 are arranged in parallel in the cooling circuit 6.

Further, in the embodiment, there are two intercoolers 9 and three turbochargers 21, which are equally arranged in parallel in the cooling circuit 6. The three turbochargers 21 and the two intercoolers 9 are also arranged in parallel in the charge air duct and therefore pressurize or cool the charge air in parallel.

Further, heat exchange ducts 19 for an entry part of the intercoolers 9 are arranged in series downstream of the heat exchange ducts of the intercoolers 9 in the cooling circuit 6.

For distributing the cooling liquid to the various heat exchange ducts, distribution elements 20 are provided upstream and downstream of the heat exchange ducts in the cooling circuit 6. For controlling the volume of liquid flow through the parallel ducts, throttles 23 are used.

Cooling circuit 6 used for cooling of the intercooler may be a low temperature cooling circuit.

In addition to the cooling circuit 6, the engine may be provided with a high temperature cooling circuit 100. This high temperature cooling circuit may be a separate circuit from the low temperature cooling circuit and equally provided with a heat exchanger or radiator for cooling of the cooling liquid flowing through the high temperature cooling circuit. Further, the high temperature cooling circuit may equally comprise adjusting means for adjusting the temperature in the high temperature circuit, and a water pump. For example, the high temperature cooling circuit may be used for cooling oil, the fly wheel housing, the cylinder liners, the fuel injectors, the cylinder heads and/or other part of the engine 110.

In possible implementations of the present disclosure, the adjusting device 7 of the cooling circuit 6 for cooling of the intercooler could also be provided in such a way that the temperature of the cooling liquid flowing though the intercooler is controlled by adding cooling liquid from the high temperature cooling circuit 100 to the cooling liquid of the low temperature cooling circuit. In an embodiment, the high temperature and a low temperature cooling circuit may be provided separately.

Further, in alternative embodiments, a single cooling circuit could be used for cooling the intercooler and all other engine components.

Figure 3:
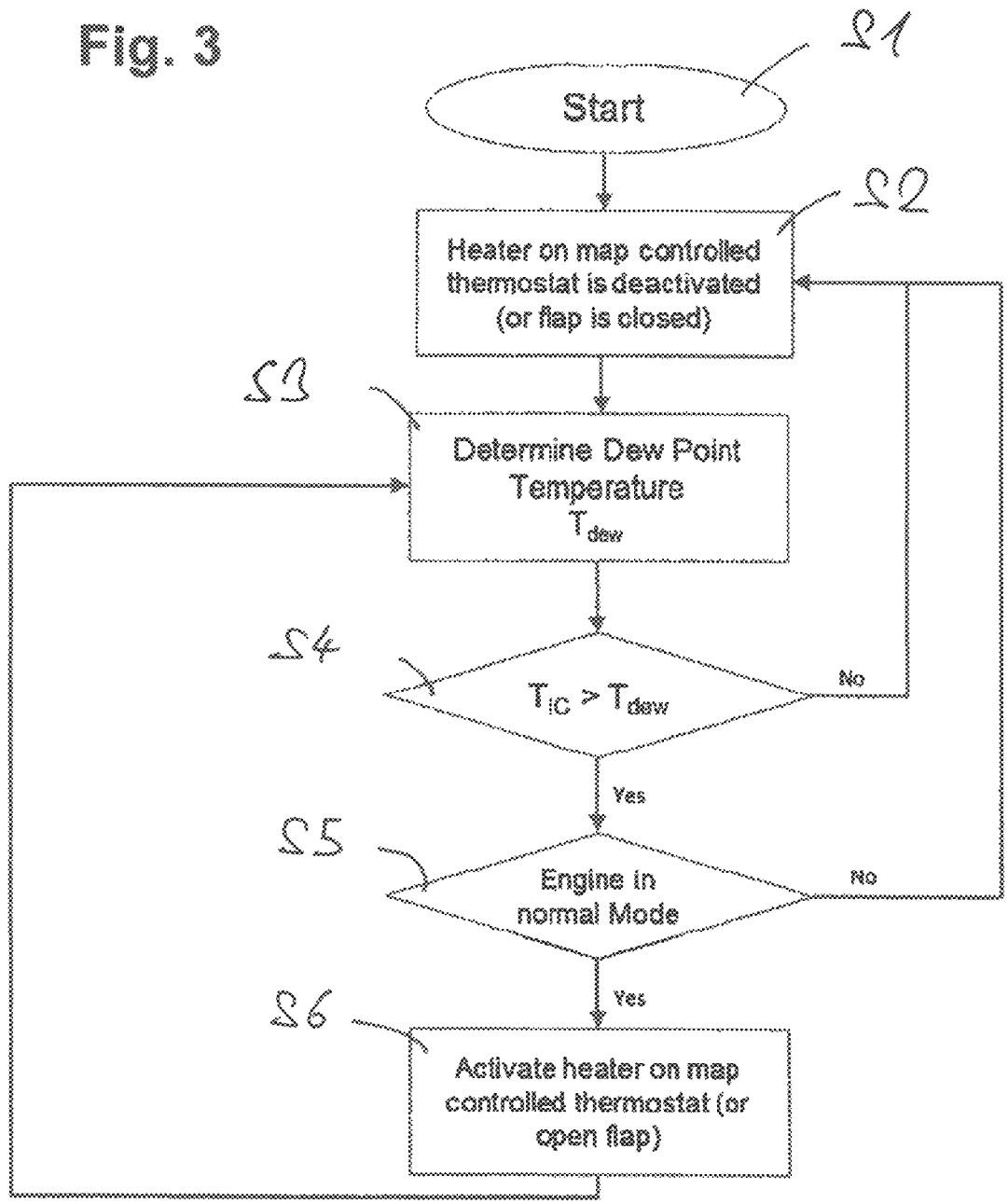
FIG. 3: shows an embodiment of a method of the present disclosure for operating an inventive engine.

FIG. 3 shows an embodiment of a control method for controlling the adjusting device 7. In step S1, the method is started. In step S2, the heater on the map controlled thermostat is deactivated or, if a flap is used, the flap is closed. Thereby, cooling liquid will flow though the bypass 21 of the heat exchanger 17. In step S3, the dew point temperature $T_{dew}$ is determined. In step S4, the temperature $T_{ic}$ of the cooling liquid flowing through the intercooler is determined, and compared with dew temperature $T_{dew}$. As long as the temperature $T_{ic}$ of the cooling liquid flowing through the intercooler is below or at dew point temperature $T_{dew}$, the method returns to step S2, such that the cooling liquid 6 is not cooled the heat exchanger 17. However, once the temperature $T_{ic}$ of the liquid flowing through the intercooler raises above dew point temperature $T_{dew}$, the method proceeds to step S5. In this step, it is checked whether the engine is in normal mode. If the engine is not in normal mode, the method goes back to step S2. If the engine is in normal mode, the method proceeds to step S6. In this step, the heater on the map controlled thermostat is activated, or if a flap is used, the flap is opened. Thereby, (more) cooling liquid will flow through the heat exchanger 17, cooling the cooling liquid in the cooling circuit 6.

By this method, the temperature $T_{ic}$ of the cooling liquid flowing though the intercooler is kept at the dew point temperature $T_{dew}$.

In the embodiment described so far, the temperature of the cooling liquid flowing though the intercooler is controlled. Alternatively, the temperature of the intercooler could be controlled. In such an embodiment, the temperature sensor 8 would not be arranged in the cooling circuit, but at the intercooler 9 for measuring the temperature of the intercooler.

The control method of the present application can also take into account engine conditions for the control of the temperature of the cooling liquid or of the intercooler. In particular, a higher charge air pressure will lead to a higher dew point temperature. Therefore, situations where the charge air pressure increases from a low level to a high level are particularly problematic with respect to condensation. In particular, if the charge air pressure is increased, the temperature of the intercooler has to be raised in order to remain at or above the increased dew point temperature.

For this purpose, the engine controller can for example control the temperature of the cooling liquid or the intercooler with a safety margin with respect to dew point temperature, wherein the safety margin is bigger at lower charge air pressure, and smaller at higher charge air pressure. Alternatively or in addition, the engine control unit may anticipate high charge air pressure situations, and increase the temperature of the cooling liquid or the intercooler on the basis of such an anticipation.

The present application can be used for any kind of internal combustion engine and for any kind of machine application. Optionally, the present disclosure is however used for large internal combustion engines. In particular, the present disclosure may be used for internal combustion engines having 10 or more cylinders, optionally 12 or more cylinders, and/or a total displacement volume of more than 10 liters, in particular more than 20 liters.

The engine can for example be used as a drive for mobile machines, such as excavators or dumper trucks. Alternatively, the internal combustion engine could be used to drive a generator for generating electricity.

The invention claimed is:

1. An internal combustion engine comprising a turbocharger, an intercooler, and a cooling circuit for cooling of the intercooler, the cooling circuit comprising an adjusting device for adjusting a temperature of a cooling liquid of the cooling circuit flowing through the intercooler, the internal combustion engine comprising a controller for controlling the adjusting device of the cooling circuit, the controller configured to determine a dew point temperature of charge air, wherein the controller is configured to control the adjusting device to adjust the temperature of the cooling liquid and/or of the intercooler relative to the dew point temperature;
wherein the internal combustion engine further comprises a temperature sensor for sensing the temperature of the cooling liquid and/or of the intercooler, the controller further comprising a feedback function for comparing the temperature sensed by the temperature sensor with a dew point temperature threshold, the controller being configured to control the adjusting device in dependence on an output of the feedback function,
wherein the cooling circuit is provided with a radiator for cooling the cooling liquid flowing through the cooling circuit, wherein the adjusting device is configured to control a liquid flow through the radiator and a bypass of the radiator, wherein by controlling the liquid flow through the radiator relative to the liquid flow through the bypass, the temperature of the cooling liquid flowing through the cooling circuit is controlled, wherein the controller is configured to control the adjusting device to increase the liquid flow through the radiator relative to the liquid flow through the bypass of the radiator for reducing the temperature of the cooling liquid flowing through the cooling circuit and to reduce the liquid flow through the radiator relative to the liquid flow through the bypass of the radiator for increasing the temperature of the cooling liquid flowing through the cooling circuit.

2. The internal combustion engine of claim 1, wherein the adjusting device comprises a control element for controlling a cooling liquid flow through a heat exchanger of the cooling circuit used for cooling the cooling liquid and/or through a by-pass of the heat exchanger of the cooling circuit.

3. The internal combustion engine of claim 2, wherein the control element is a passive temperature control element of a thermostat provided with a resistive heater for adjusting a temperature of the passive temperature control element, and/or wherein the control element comprises a controlled valve.

4. The internal combustion engine of claim 1, further comprising an ambient air pressure sensor and/or an ambient air temperature and/or a humidity sensor, wherein sensor values are used as input for the controller for determining the dew point temperature.

5. The internal combustion engine of claim 1, further comprising a charge air pressure sensor, wherein sensor values are used as input for the controller for determining the dew point temperature, and/or wherein the controller has a function for determining charge air pressure in dependence on engine parameters, or a more advanced boost pressure model, wherein the determined charge air pressure is used as input for the controller for determining the dew point temperature.

6. The internal combustion engine of claim 1, wherein the cooling circuit is a low temperature cooling circuit, the engine further comprising a high temperature cooling circuit.

7. The internal combustion engine of claim 6, wherein the low temperature cooling circuit is used for cooling the intercooler and at least the turbocharger, wherein the intercooler and the turbocharger are arranged in parallel in the low temperature cooling circuit.

8. The internal combustion engine of claim 3, wherein the controlled valve is a controlled flap.

9. The internal combustion engine of claim 5, wherein the engine parameters are engine speed and injected fuel quantity.

10. The internal combustion engine of claim 6, wherein the low temperature cooling circuit and the high temperature cooling circuit are independent from each other and there is no mixing of the cooling liquid of the low temperature cooling circuit and the high temperature cooling circuit.

11. The internal combustion engine of claim 1, wherein the turbocharger comprises a compressor and a turbine, with air entering the compressor from an air inlet channel and being compressed and flowing through a charge air duct to an inlet manifold of the engine, which feeds cylinders of the engine with pressurized air, wherein from the cylinders, exhaust gases flow through an exhaust channel to a turbine of the turbocharger, and, after expanding in the turbine, flow through an exhaust gas duct, with the turbine of the turbocharger being mechanically connected to the compressor of the turbocharger in order to drive the compressor, wherein the intercooler is arranged upstream of the compressor between the compressor and an inlet manifold of the engine.

12. The internal combustion engine of claim 1, wherein a plurality of intercoolers and turbochargers are arranged in parallel in the cooling circuit, wherein the plurality of intercoolers and turbochargers are also arranged in parallel in a charge air duct and therefore pressurize or cool the charge air in parallel.

13. The internal combustion engine of claim 1, wherein a heat exchange duct for an entry part of the intercooler is arranged in series downstream of the heat exchange duct of the intercooler in the cooling circuit.

14. The internal combustion engine of claim 1, wherein the adjusting device is a map controlled thermostat with a heating resistor.

15. The internal combustion engine of claim 6, wherein the high temperature cooling circuit is used for cooling a cylinder head of the engine and/or a cylinder liner of the engine and/or engine oil.

16. A method for operating an internal combustion engine comprising a turbocharger, an intercooler, and a cooling circuit for cooling of the intercooler, wherein the cooling circuit is provided with a radiator for cooling a cooling liquid flowing through the cooling circuit and a bypass of the radiator, the method comprising the steps of:
determining a dew point temperature of charge air
sensing a temperature of the cooling liquid and/or of the intercooler,
comparing the temperature sensed by the temperature sensor with the dew point temperature threshold using a feedback function, and
controlling the temperature of the cooling liquid and/or of the intercooler relative to the dew point temperature by adjusting the temperature of the cooling liquid flowing through the intercooler in dependence on an output of the feedback function,
wherein the adjusting of the temperature of the cooling liquid comprises increasing a liquid flow through the radiator relative to a liquid flow through the bypass of the radiator for reducing the temperature of the cooling liquid flowing through the cooling circuit and to reduce the liquid flow through the radiator relative to the liquid flow through the bypass of the radiator for increasing the temperature of the cooling liquid flowing through the cooling circuit.

17. A mobile working machine comprising an engine, the engine comprising a turbocharger, an intercooler, and a cooling circuit for cooling of the intercooler, the cooling circuit comprising an adjusting device for adjusting a temperature of a cooling liquid of the cooling circuit flowing through the intercooler, the engine comprising a controller for controlling the adjusting device of the cooling circuit, the controller configured to determine a dew point temperature of charge air, wherein the controller is configured to control the adjusting device to adjust the temperature of the cooling liquid and/or of the intercooler relative to the dew point temperature,
wherein the engine further comprises a temperature sensor for sensing the temperature of the cooling liquid and/or of the intercooler, the controller further comprising a feedback function for comparing the temperature sensed by the temperature sensor with a dew point temperature threshold, the controller being configured to control the adjusting device in dependence on an output of the feedback function, and
wherein the cooling circuit is provided with a radiator for cooling the cooling liquid flowing through the cooling circuit, wherein the adjusting device is configured to control a liquid flow through the radiator and a bypass of the radiator, wherein by controlling the liquid flow through the radiator relative to the liquid flow through the bypass, the temperature of the cooling liquid flowing through the cooling circuit is controlled, wherein the controller is configured to control the adjusting device to increase the liquid flow through the radiator relative to the liquid flow through the bypass of the radiator for reducing the temperature of the cooling liquid flowing through the cooling circuit and to reduce the liquid flow through the radiator relative to the liquid flow through the bypass of the radiator for increasing the temperature of the cooling liquid flowing through the cooling circuit.

18. The mobile working machine according to claim 17, wherein the machine comprises a generator driven by the engine.

* * * * *